United States Patent [19]

Shreve

[11] 4,213,697
[45] Jul. 22, 1980

[54] PHASE MEASURING DEVICE

[75] Inventor: James S. Shreve, Fairfax, Va.

[73] Assignee: The United States of America as represented by the Secretary of the Army, Washington, D.C.

[21] Appl. No.: 957,779

[22] Filed: Nov. 6, 1978

[51] Int. Cl.² ............................................. G01B 9/02
[52] U.S. Cl. ................................................... 356/351
[58] Field of Search ........................................ 356/351

[56] References Cited

U.S. PATENT DOCUMENTS

| | | | |
|---|---|---|---|
| 3,409,375 | 11/1968 | Hubbard | 356/351 |
| 3,601,490 | 8/1971 | Erickson | 356/351 |
| 3,635,552 | 1/1972 | DeLang | 356/351 |
| 3,694,088 | 9/1972 | Gallagher | 356/351 |

Primary Examiner—Conrad J. Clark
Attorney, Agent, or Firm—Nathan Edelberg; Robert P. Gibson; Saul Elbaum

[57] ABSTRACT

An improved phase measuring method and apparatus for measuring the relative phase and amplitude of an applied optical signal beam at a number of points in a plane. The combination of the signal beam and a reference beam are simultaneously directed onto a pair of photodector arrays, the reference beam on one array being $\pi/2$ radians out of phase with the reference beam on the other array. Respective interference patterns are formed on the photodector arrays, points on the arrays are sampled, and the desired amplitude and phase of the signal beam at the sampling points is determined by a series of computational steps.

9 Claims, 4 Drawing Figures

FIG.2
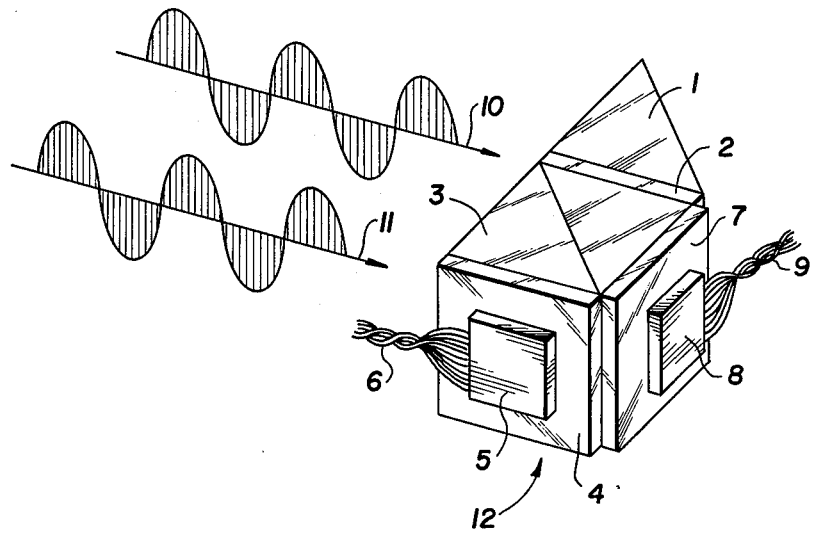
FIG.3
FIG.4
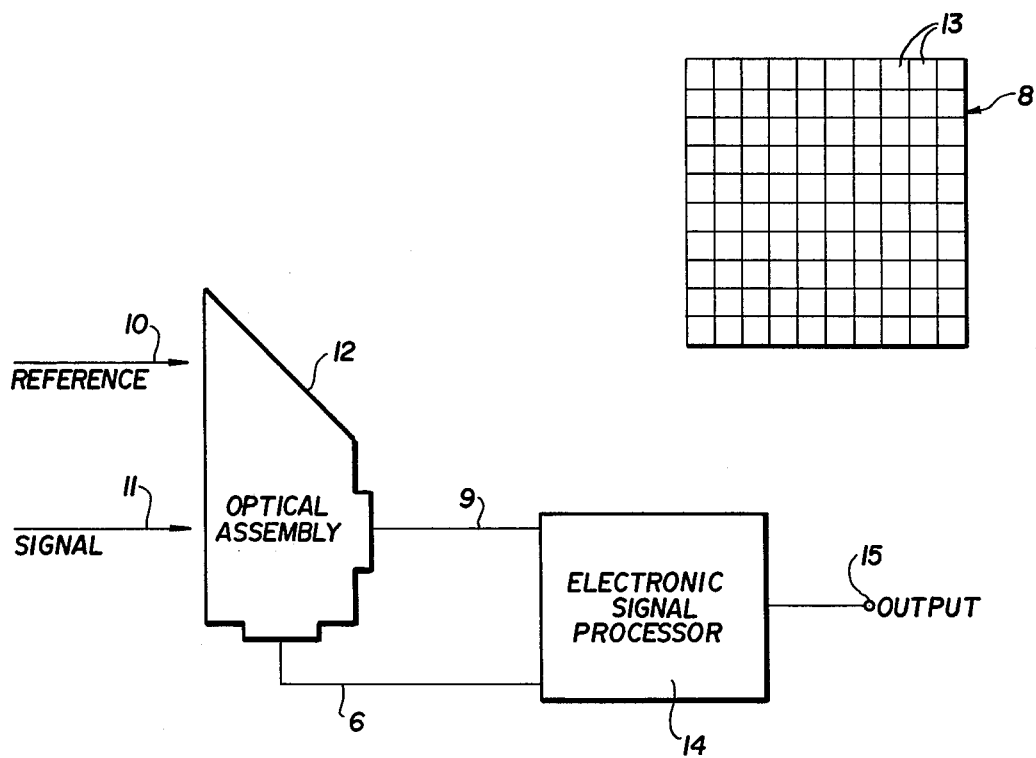

PHASE MEASURING DEVICE

RIGHTS OF THE GOVERNMENT

The invention described herein may be manufactured, used, and licensed by or for the United States Government for governmental purposes without the payment to me of any royalty thereon.

The present invention is directed to an improved method and apparatus for measuring the relative phase and the amplitude of an applied optical signal beam at a number of sampling points in a plane.

Systems for measuring the relative phase and amplitude of a beam are known in the prior art, but typically involve the sequential phase shifting of a reference beam and the use of an optical component whose optical length must change with time. More particularly, in the prior art known to applicant, an optical reference beam is mixed with the signal beam, and the resultant optical intensity is measured at each sampling point and stored. One of the optical beams is then phase shifted a known amount, and the resultant intensity is again measured at each sample point and stored. Additional phase shifts and intensity measurements may be made sequentially, although two are sufficient under certain constraints. From the two or more sets of intensity measurements the relative phase and amplitude of the signal beam at each sample point is determined.

As in the prior art, the present invention incorporates means for mixing a reference beam with the signal beam, and makes use of two sets of intensity measurements made with two phases of the reference beam. However, according to the invention, the two sets of intensity measurements are made simultaneously rather than sequentially and there is thus no sequential phase shifting, and no need for an optical component whose optical length must change with time. As a result, the present invention operates faster then the prior art system and is also less complex to build and operate. Further, the simultaneous measurement technique utilized eliminates problems caused by phase drifting of the optical beams, which can be troublesome when the successive measurement technique is utilized.

It is therefore an object of the invention to provide a method and apparatus for measuring the phase and amplitude of an optical signal beam, which is fast and relatively easy to operate.

It is a further object of the invention to provide such a method and apparatus which does not use any moveable optical parts.

It is still a further object of the invention to provide such a method and apparatus which allows the phase and amplitude to be determined by the application of relatively simple mathematical operations.

It is still a further object of the invention to provide an apparatus for measuring the phase and amplitude of an optical signal beam, which is relatively compact and rugged.

The above objects are accomplished by simultaneously providing the combination of a signal beam and a reference beam on a pair of photodector arrays, the reference beam on one array being $\pi/2$ radians out of phase with the reference beam on the other array. Respective interference patterns are formed on the two arrays, corresponding cells of the two arrays are sampled, and a series of computational steps is performed on the sampled values to provide the desired amplitude and phase of the signal beam at the sampled cells.

The invention will be better understood by referring to the accompanying Figures in which:

FIG. 2 is an assembled view of the optical assembly of FIG. 1, and also shows where the signal beam and reference beam are applied.

FIG. 3 is a pictorial illustration of a photodetector array which is utilized in the system of the invention.

FIG. 4 is a block diagram of the entire apparatus disclosed.

Figure 1:
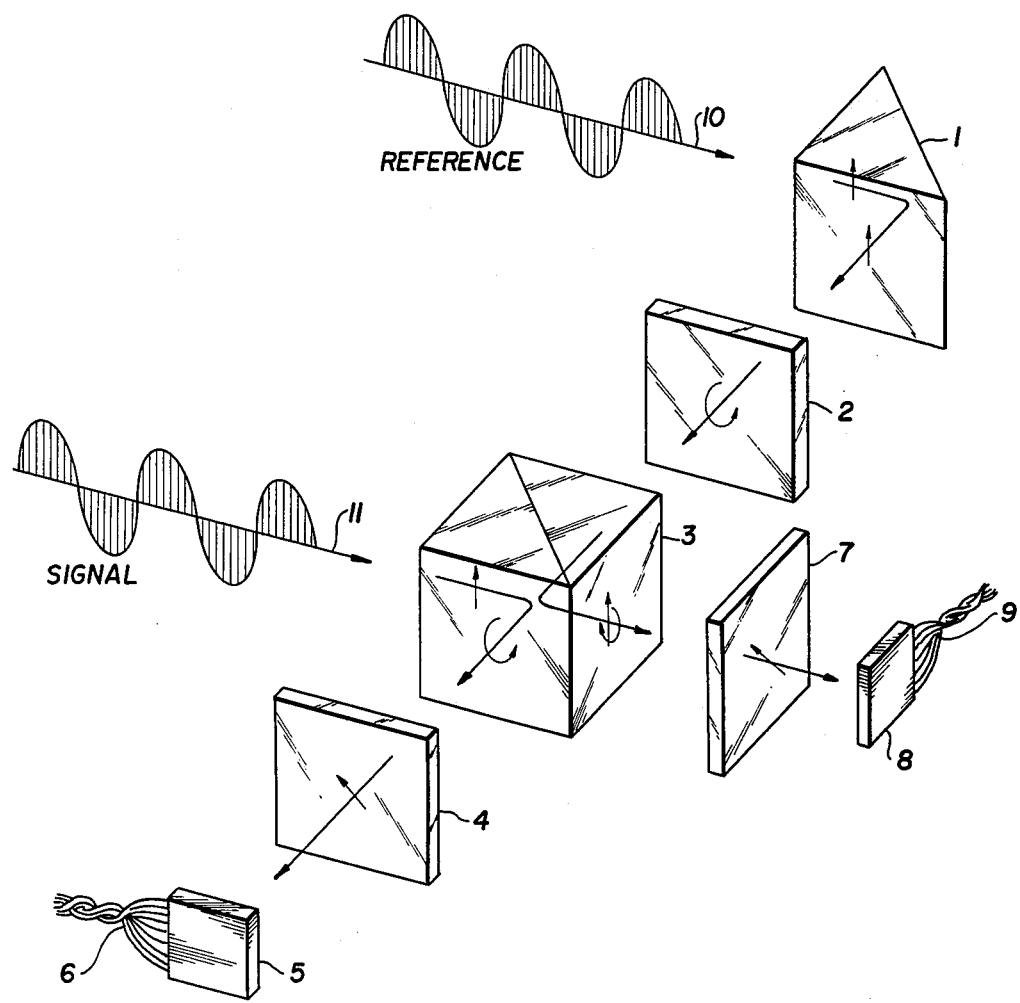
FIG. 1 is an exploded view of the optical assembly of the invention and shows the optical paths of the signal beam and reference beam.

Referring to FIG. 1, it is desired to measure the amplitude and relative phase of the optical energy in signal beam 11 at a number of points in a plane which is intercepted by the beam. It should be understood that beam 11 is a generalized signal beam and could contain light energy representative of any selected or arbitrary function, scene, etc.

Reference beam 10 is provided and is arranged to be coherent with signal beam 11, by, for instance, being derived from the same optical source as beam 11. The signal beam 11 is incident on cube beam splitter 3 which is arranged to direct a fraction of the beam energy directly through the beam splitter to polarizer 7 and photodector array 8, and to reflect a like fraction of the beam energy to polarizer 4 and photodetector array 5.

The reference beam 10 is directed through quarter-wave plate 2 to beam splitter 3 by prism 1. If desired, the reference beam could be arranged to strike the quarter-wave plate directly so that the prism 1 would not be required. A fraction of the energy of the reference beam 10 passes directly through the beam splitter to the polarizer 4 and photodetector array 5, while a like fraction is reflected within the beam splitter to the polarizer 7 and photodetector array 8.

The signal beam and reference beam are assumed to be vertically polarized where they are incident upon the optical assembly, although any other plane polarization angle could be accommodated by proper orientation of the quarter-wave plate 2 and the polarizers 4 and 7. The reference beam is assumed to have a cross section large enough to illuminate the photodector arrays 5 and 8 over their entire photosensitive surfaces, or at least over an area of interest. The reference beam is also assumed to be a plane wave, although if desired perturbations in the measured phase caused by a non-planar wave could be calibrated out of the system.

Again, referring to FIG. 1, the reference beam 10 is vertically polarized upon entering and upon exiting from the prism 1, as is indicated by the vertical arrows on the faces of the prism. The quarter-wave plate 2 is oriented so as to convert the plane-polarized reference beam into a circularly-polarized beam, as is indicated by the circular arrow on the face of the quarter-wave plate. The two polarizers 4 and 7 resolve the circularly-polarized beam into two plane-polarized beams which are $\pi/2$ radians out of phase. These polarizers are similarly oriented so that they pass light energy which is polarized at an angle of $\pi/4$ radians to the vertical, as is indicated by the slanted arrows on their faces. The relative phase shift occurs because the sense of the reference-beam polarization is reversed for the path through the beam splitter that includes a reflection, but not for the other path, as is indicated by the oppositely-directed circular arrows on the exit faces of the beam splitter. Thus, relative to the beams incident upon the polarizers, the polarizers have planes of polarization which are crossed, which results in beams exiting the polarizers which are plane polarized and relatively phase shifted by $\pi/2$ radians.

The signal beam 11 does not pass through a quarter-wave plate, and therefore it remains plane polarized. The signal beam incident upon each polarizer 4 and 7 has vertical polarization and therefore the beam exiting from each polarizer is attenuated but not relatively phase shifted.

Therefore, each photodetector array 5 and 8 has incident upon its photosensitive surface a combination of the signal beam and the reference beam, with the phase of the reference beam at one photodetector array being shifted $\pi/2$ radians with respect to the phase of the reference beam at the other array.

The interaction of the signal beam and the reference beam causes an interference pattern to be formed on the photodetector arrays, with different patterns being formed on the respective arrays because of the relative phase shift of the reference beam on the arrays. By measuring the intensity of the interference pattern at various points on the array, the amplitude and relative phase of the signal beam at those points can be determined.

It should be noted that one photodetector array sees a signal image which is reversed right-to-left with respect to that seen by the second photodetector array because of the reflection within the beam splitter in one optical path. A given sample point in the signal beam will therefore appear at different positions in the two photodector arrays and this shift should be taken into account when the intensity measurements are paired for each sample point.

A typical photodector array 8 is shown in FIG. 3 and is seen to be comprised of a matrix of cells 13. Photodector arrays are commercially available in which the cells 13 are highly miniaturized, and in which each cell 13 can be considered to approximate a "point", and such highly miniaturized arrays are used in the system of the present invention. The terms "point" and "sampling point" as used in the present specification are therefore to be understood as meaning the area of a highly miniaturized photodector cell. The interference patterns on the arrays are sampled at corresponding cells of the arrays, and, as known to those skilled in the art, the cells may be read out either in serial or parallel formats.

The electrical outputs from corresponding cells of the arrays provide a measure of the optical intensities at particular samples of the signal beam. To determine the desired information, let $R_1$ and $R_2$ be the instantaneous amplitudes of the combined signal and reference beams at a given sample point at the two photodector arrays. All amplitude and intensity values are normalized so that the reference beam by itself would display unity peak amplitude at the photodetector arrays. If k is the peak signal amplitude at the sample point, and if $\phi$ is the signal phase relative to the reference beam at one photodector array and $\phi - \pi/2$ is the signal phase relative to the reference beam at the other photodector array then $$R_1^2 = [\cos wt + k \cos(wt+\phi)]^2 + [\sin wt + k \sin(wt+\phi)]^2, \quad (1.)$$

$$R_2^2 = [\cos(wt+\pi/2) + \cos(wt+\phi)]^2 + [\sin(wt+\pi/2) + k \sin(wt+\phi)]^2, \quad (2.)$$

where w is the optical frequency in radians per unit time. The corresponding intensities can be found by squaring the amplitudes and integrating over the optical period T:

$$A_1 = \frac{1}{T} \int_0^T R_1^2 dt, \quad (3.)$$

or $$A_1 = 1 + k^2 + 2k \cos \phi, \quad (4.)$$

and $$A_2 + \frac{1}{T} \int_0^T R_2^2 dt, \quad (5.)$$

or $$A_2 = 1 + k^2 + 2k \sin \phi. \quad (6.)$$

Now $A_1$ and $A_2$ are the quantities directly measured by the photodetector arrays, while k and $\phi$ are the quantities sought. For convenience the results will be found in terms of $\theta$ instead of $\phi$, where $\theta = \phi + \pi/4$. Obviously $\theta$ is just as appropriate a measure of relative phase as is $\phi$.

Let us define the sum S and the difference D by $$S = A_1 + A_2,$$

and $$D = A_1 - A_2.$$

It then follows that $$k^2 = (\tfrac{1}{2})S \pm \sqrt{S - (\tfrac{1}{2})D^2 - 1}, \quad (7.)$$

and $$\cos \theta = D/(\sqrt{8}k). \quad (8.)$$

This can be seen by solving equations (4.) and (5.) for sin $\phi$, the substituting into the trigonometric formula $\sin^2 \phi + \cos^2 \phi = 1$.

By constraining the allowable input signal intensity so that $0 \leq k \leq \sqrt{\tfrac{1}{2}}$, the uncertainty of sign in equation (7.) is removed, and we have $$k = \sqrt{(\tfrac{1}{2})S - \sqrt{S - (\tfrac{1}{2})D^2 - 1}}. \quad (9.)$$

This can be seen by expressing S in terms of K, sin $\phi$, and cos $\phi$, which then leads to $$S = 2(k^2 + 1) + \sqrt{8}k \sin \phi. \quad (10.)$$

Imposing the constraint results in a limit on k given by $k \leq \tfrac{1}{2}S$, which forces the sign of the radical in equation (7.) to be negative.

It is apparent that in any phase measuring device which employs continuous-wave signal and reference beams, there is an uncertainty in the number of whole cycles of phase that the signal exhibits. Thus the phase can only be expressed as a number of radians modulo $2\pi$. The number thus has a total range of $2\pi$. For convenience $\theta$ will be expressed here as angle which always lies in the range $-\pi$ to $\pi$. Equation (8.) can then be expressed as $$\theta = \arccos(D/(\sqrt{8}\, k)), \text{ for } S \geq 2(k^2 + 1) \quad (11.)$$

$$= -\arccos(D/(\sqrt{8}\, k)), \text{ for } S < 2(k^2 + 1).$$

The relationship between the value of S and the sign of the angle $\theta$ can be seen by examining equation (10.) with positive and negative angles.

Thus, all the relationships required for determining k and $\theta$ under the constraint $0 \leq k \leq \sqrt{\frac{1}{2}}$ have been given above. The routine for computing K and $\theta$ from photodetector array signals $A_1$ and $A_2$ is to form the sum and difference S and D, compute K by the mathematical operations given by equation (9.), compare the value of S with the computed $2(k^2+1)$, and perform the appropriate computations for finding $\theta$ as given in equation (11.)

While it is possible to perform the above computations by hand, the use of a computer, for example a microprocessor, is preferred. An electronic processor 14 is pictorially depicted in FIG. 4, and is connected to optical assembly 12 by cables 6 and 9. The above-described series of mathematical operations is a routine programming problem, and a program to perform the operations could easily be devised by one skilled in the art. In FIG. 4, electronic network 14 may also include a power supply for the photodetector arrays, and circuitry for effecting read-out of pairs of cells from the respective arrays, such circuitry also being well known to those skilled in the art.

While the invention has been disclosed with respect to the use of photodetector arrays, it should be noted that other photosensitive devices such as VIDICONS could be used, but such devices would increase size, decrease ruggedness, and would require alignment adjustments periodically.

I wish it to be understood that I do not desire to be limited to the exact details of construction shown and described, for obvious modifications can be made by a person skilled in the art.

I claim:

1. A method of simultaneously providing the combination of a signal beam and a reference beam on a pair of photodetector arrays, the reference beam on one array being $\pi/2$ radians out of phase with the reference beam on the other array, from which the amplitude and phase of the signal beam at various points on the array can be determined, comprising the steps of:
   providing a plane polarized signal beam,
   providing a plane polarized reference beam which is coherent with said signal beam,
   providing a pair of photodetector arrays,
   directing a portion of said plane polarized signal beam onto each of said photodetector arrays,
   converting said plane polarized reference beam to a pair of circularly polarized beams which are circularly polarized in opposite directions,
   deriving a first plane polarized reference beam from one of said circularly polarized beams and a second plane polarized reference beam $\pi/2$ radians out of phase with said first reference beam from said other circularly polarized beam, and redirecting said first reference beam onto one of said arrays and said second reference beam onto the other of said arrays whereby said combination of signal and reference beams is provided on said arrays.

2. The method of claim 1 wherein said deriving is accomplished by passing said first and second circularly polarized beams through first and second polarizers.

3. An apparatus for simultaneously providing the combination of a signal beam and a reference beam on a pair of photodetector arrays, the reference beam on one array being $\pi/2$ radians out of phase with the reference beam on the other array, from which the amplitude and phase of the signal beam at various points on the array can be determined, comprising,
   a signal beam means for providing a plane polarized reference beam which is coherent with said signal beam,
   a pair of photodetector arrays, means for directing a portion of said plane polarized signal beam onto each of said photodetector arrays,
   means for converting said plane polarized reference beam to a pair of circularly polarized beams which are circularly polarized in opposite directions,
   means for deriving a first plane polarized reference beam from one of said circularly polarized beams and a second plane polarized reference beam $\pi/2$ radians out of phase with said first beam from said other circularly polarized beam and for directing said first reference beam onto one of said arrays and said second reference beam onto the other of said arrays, whereby said combination of signal and reference beams is provided on said arrays.

4. The apparatus of claim 3 wherein said means for deriving and directing comprises first and second polarizers.

5. The apparatus of claim 4 wherein said means for converting said plane polarized reference beam to a pair of circularly polarized beams which are circularly polarized in opposite directions comprises a quarter-wave plate and a beam splitter.

6. The apparatus of claim 5 wherein said means for directing a portion of said signal beam onto each of said photodetector arrays also comprises said beam splitter.

7. The apparatus of claim 6 wherein said beam splitter is a cube beam splitter.

8. The apparatus of claim 6 wherein said first and second polarizers have their plane of polarization oriented at 45° to the vertical.

9. The apparatus of claim 7 wherein said first and second polarizers are mounted on faces of said cube beam splitter and wherein said photodetector arrays are mounted respectively on said first and second polarizers.

* * * * *